INVENTOR.
EDWARD M. SPLAINE
BY Louis L. Gagnon
ATTORNEY

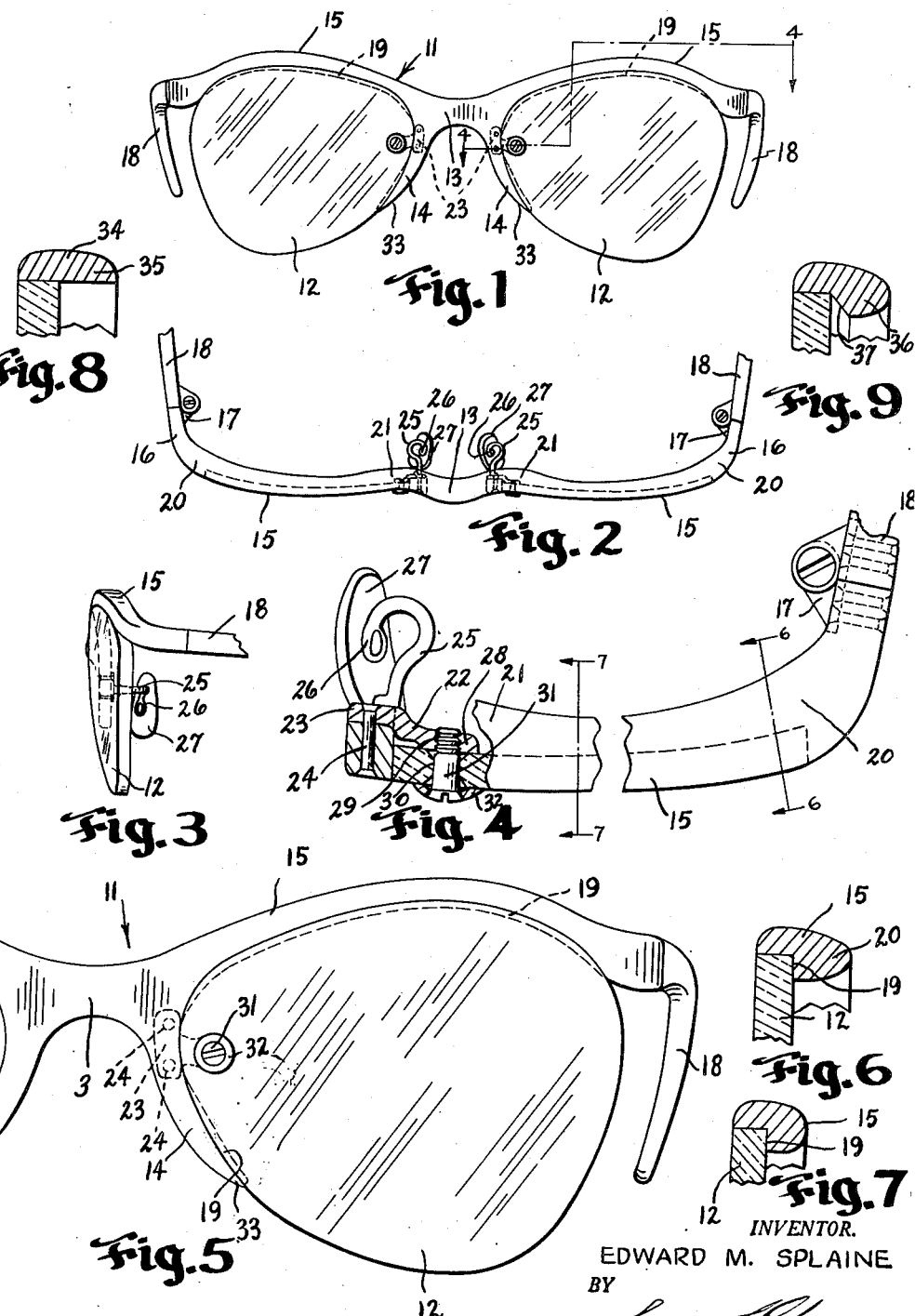
May 8, 1951      E. M. SPLAINE      2,552,123
OPHTHALMIC MOUNTING
Filed July 1, 1946      2 Sheets-Sheet 1
INVENTOR.
EDWARD M. SPLAINE
BY
ATTORNEY May 8, 1951 E. M. SPLAINE 2,552,123
OPHTHALMIC MOUNTING
Filed July 1, 1946 2 Sheets-Sheet 2

Patented May 8, 1951

2,552,123

UNITED STATES PATENT OFFICE 2,552,123

OPHTHALMIC MOUNTING

Edward M. Splaine, Southbridge, Mass., assignor to American Optical Company, Southbridge, Mass., a voluntary association of Massachusetts Application July 1, 1946, Serial No. 680,582

2 Claims. (Cl. 88—41)

This invention relates to improvements in ophthalmic mountings and has particular reference to a semi-rimless type mounting and method of making the same.

One of the principal objects of the invention is to provide a semi or half rim type mounting of non-metallic material having an integral bridge portion and temple supporting portions shaped to follow substantially the upper contour shape of the lenses with the said temple supporting portions being increased in thickness at given selected locations thereon for increasing the rigidity thereof and aiding in retaining them in prefabricated shape and further embodying adjustable lens connection means adapted to function cooperatively with an adjacent portion of the supporting structure for rigidly retaining the lenses in adjusted position in alignment with the temple supports and with the portion of the mounting adjacent the connection means providing a long bearing surface with the edge of the lenses, and having a yielding cushioning effect in supporting the lenses in adjusted position.

Another object is to provide a structure of the above character with long and slender temple supporting portions which are shouldered to form a groove in which the upper edge of the lenses may be seated to aid in retaining the said lenses and arms in proper aligned relation with each other.

Another object is to provide arms of the above character with portions of increased thickness disposed rearwardly of the plane of the lenses and having a clearance with the adjacent rear portion of the surface of the lenses for avoiding collection of dirt, dust, etc. and for affording ease in cleaning the mounting and lenses.

Another object is to provide a mounting of the above character with adjustable lens connection means and with adjustable nose pad supporting means.

Another object is to provide a new and improved semi-rimless type mounting formed primarily of non-metallic material and method of making same.

Another object of the invention is to provide a semi-rimless mounting to which lenses having different optical characteristics may be quickly and easily fitted and connected.

Another object is to provide a lens connecting member which may be quickly and easily adjusted to fit the shape of the surface of the lens to which it is connected.

Another object is to provide a supporting structure with portions thereof enlarged in cross section to provide increased strength and rigidity.

Another object is to provide a semi-rimless spectacle type mounting adapted to permit a wide variety of different shaped lenses to be used therewith.

Another object is to provide a structure of the above nature which will be strong and efficient and which will have an attractive appearance.

Other objects and advantages of the invention will become apparent from the following description taken in connection with the accompanying drawings, and it will be apparent that many changes may be made in the details of construction, arrangement of parts and methods shown and described, without departing from the spirit of the invention as expressed in the accompanying claims. I therefore, do not wish to be limited to the exact details and methods shown and described, as the preferred forms only have been given by way of illustration.

Referring to the drawings:

Fig. 1 is a front elevational view of a semi-rimless spectacle mounting embodying the invention;

Fig. 2 is a top plan view of the mounting shown in Fig. 1;

Fig. 3 is a side elevational view thereof;

Fig. 4 is an enlarged partial sectional view taken on line 4—4 of Fig. 1;

Fig. 5 is an enlarged front elevational view with a portion broken away;

Fig. 6 is a sectional view of the rim as taken on line 6—6 of Fig. 4;

Fig. 7 is a sectional view of the rim as taken on line 7—7 of Fig. 4;

Fig. 8 is a sectional view of the rim showing a modification thereof;

Fig. 9 is a sectional view of a further modification of the rim;

Figure 10:
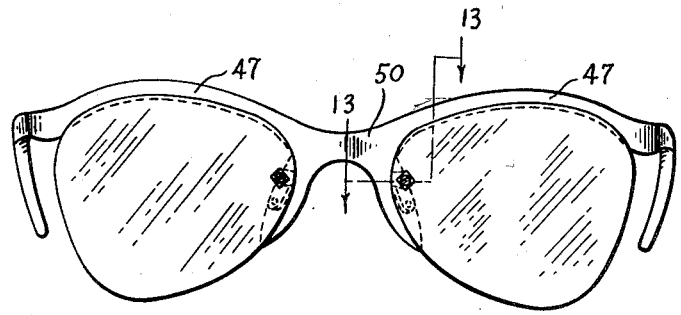
Fig. 10 is a front elevational view of a further modified form of the invention.
Figure 11:
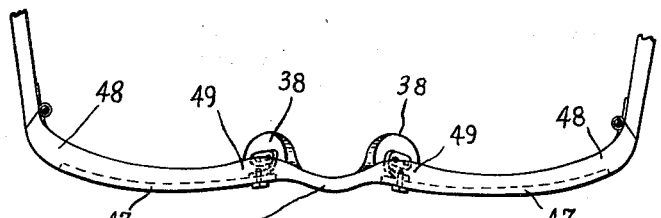
Fig. 11 is a top plan view of the mounting shown in Fig. 10.
Figure 12:
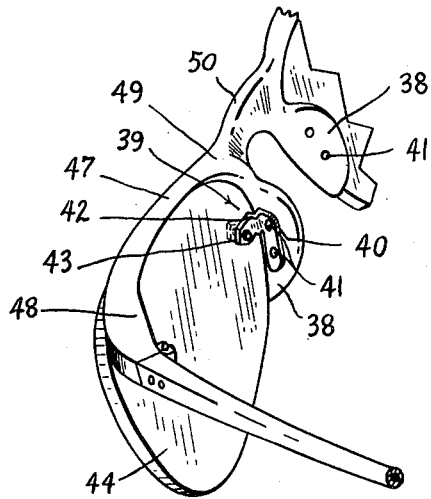
Fig. 12 is a fragmentary rear perspective view of the mounting shown in Figs. 10 and 11.

Referring more particularly to the drawings wherein like characters of reference designate the parts throughout the several views, the device embodying the invention comprises a lens supporting member 11 adapted to support the lenses 12 before the eyes of a wearer.

The lens supporting structure 11 is preferably formed of a non-metallic material such as cellulose acetate, cellulose nitrate, methyl methacrylate or any other similar plastic or artificial resinous material. The said member 11, however, could be formed of any other light weight material found to be suitable and is preferably formed in a single unit by molding, casting, or shaping from said material.

The member 11 comprises a bridge portion 13 adapted to fit about the nose of the wearer and having depending side portions 14 shaped to the adjacent contour shape of the lenses and to extend downwardly of the sides of the nose and having outwardly extending rim portions 15 shaped substantially to the upper contour shape of the lenses and terminating in outwardly and rearwardly curving end portions 16 to which temples 18 are pivotally connected as illustrated at 17.

In the construction illustrated in Figs. 1 through 7 the depending portions 14 and rim portions 15, throughout the major portions of the lengths thereof, are provided with shouldered portions 19 against which the lenses 12 are adapted to be seated. These shouldered portions are best shown in Figs. 6 and 7.

To provide added strength and rigidity to the lens supporting structure at said localities the said rims are enlarged in cross section as shown at 20 and 21. This not only increases the strength and rigidity at said locations but also tends to prevent the structure from warping or distorting from the shape to which they were originally fabricated.

It is particularly pointed out that the rims in general are increased in cross section which is primarily disposed in the rear of the plane of the lenses or extends in a direction rearwardly of and substantially perpendicular to the plane of the lenses whereby the rims or arms when viewed from the front will indicate little, if any, increase in thickness as compared to the usual conventional thickness of rim. The portions 20 and 21, however, are of greater cross sectional dimension than the remainder of the rims.

The rim sections or arms 15 and depending side portions of the bridge are prefabricated to receive a definite shape of lens and to produce a definite controlled size of mounting. These sizes are graded according to standard commercial practice which includes not only the controlling or grading of the sizes of mounting but also includes the grading of the sizes and related shapes of lenses.

The lens supporting rims and inwardly located depending portions of the bridge are shaped to have a relatively intimate fit with the adjacent contour edges of the lenses and are held in assembled relation with the lenses by means of lens straps embodying an intermediate adjustable portion 22, an attaching plate portion 23 and a perforated ear 28 having a threaded opening 29 therein. The plate portions 23 are secured to the depending portions 14 adjacent their point of joinder with the rim portions 15 by means of pins or the like 24 which extend through the plates and through the material of the depending portions as best illustrated in Fig. 4.

The plates 23 provide attachment means to which nose pad supporting arms 25 are secured by solder or the like adjacent the forward ends thereof. The nose pad supporting arms 25 extend rearwardly and downwardly and terminate in nose pad connection ends 26 to which the nose pads 27 may be rigidly or pivotally connected. The nose pad supporting arms 25 are adapted to be adjustable so that the individual fitting the mounting to the wearer may adjust the pads to properly position the lens supporting structure and lenses on the face of the wearer and in proper relation with the eyes.

It is particularly pointed out that the lens strap ears 28 are of greater thickness than the intermediate adjustable portions 22, that is, they have a lens engaging face which protrudes forwardly of the intermediate portions 22 so as to cause said portions 22 to be spaced from the adjacent edges of the lenses.

In connecting the lenses 12 to the lens supporting structure 11 the lenses are first places in positions with the rear surfaces thereof resting against the shoulders 19. The strap is checked for adjustment to determine whether or not its lens face engaging surface engages with the rear surface of the lens when in said seated relation with the lens supporting structure. It is first pointed out that the usual lens connection opening 30 is formed in the lens to receive the lens connection or screw 31. In this particular instance the screw extends through a cupped washer 32 which engages the front surface of the lens.

When checking the relation of the lens strap with the lens it is noted whether or not the connection openings of the strap and the lens are in proper alignment with each other. If not and if the surface of the strap which is intended to engage the rear surface of the lens does not engage said surface, the intermediate portion 22 is adjusted until the above alignment of openings and engagement of the strap with the lens takes place. The connecting screw or the like 31 is then inserted in the aligned openings and is threadedly connected with the strap ear by an amount sufficient to draw the cupped washer into intimate fit with the front surface of the lens.

Figure 14:
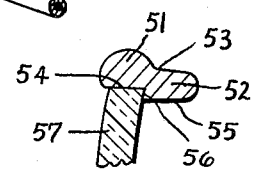
Fig. 14 is a fragmentary sectional view similar to Figs. 8 and 9 of a further modified form of the invention.

Due to the intimate fit of the depending portion 14 and adjacent portion of the rim 15 with the adjacent contour edge portions of the lens, the lens will be more positively held in proper assembled relation with the lens supporting means and the rim section or arm 15 will be retained in proper aligned relation with the lens by means of the shouldered portion 19. The lengths of the depending portion 14 and the rim or arm 15 are such as to retain the lens against pivotal movement about the connecting means 31 and thereby snugly retain the lens in fitted relation with the lens supporting structure. The distance between the shoulder 19 and the front surface of the rim or arm 15 is preferably such as to accommodate the thickness of lens or can, as shown in Fig. 14, be such as to permit the front surface of the rim or arm 15 to protrude slightly outwardly beyond the front plane of the lens.

If desired, the shape of the depending portions 14 and adjacent portions of the rims or arms 15 may be so controlled as to cause the ends 33 to be normally positioned inwardly of the plane of the adjacent contour edge portions of the lenses which, when the lens supporting structure is being assembled with the lenses, will require that the ends 33 be sprung slightly outwardly to receive the lens. This will cause the ends 33 of the depending portions to resiliently retain the lenses in fitted relation with the lens supporting structure. This will tend to force the upper contour edges of the lenses against the rim or arm portions 15 and will thereby aid in retaining the parts in proper aligned and fitted relation with each other. In other words the distance between the outer ends of the arms or rims 15 and the ends 33 of the depending portions 14 may be initially formed to be less than the diameter of the lenses along a line intersecting said portions so as to require the lenses to be forced inwardly between the arms or rims and the depending portions when being assembled with the lenses by means of the connection screw 31 and associated parts of the lens strap connection.

In Fig. 8 there is shown a modified type of lens rim portion wherein the shouldered portion 19 is eliminated thereby permitting the rim 34 to be free to move in the direction of the plane of the edge of the lens. The rim 34, however, is increased in cross section in a direction rearwardly as illustrated at 35 and has portions simulating the portions 20 and 21 which are further increased in cross sectional size thereby adding the necessary strength for preventing the rims from being forced out of shape during the act of placing the mounting on or removing it from the face and for aiding the mounting from becoming distorted from the initial shape to which it is fabricated.

Fig. 9 shows a further modification wherein the rim portions are increased in thickness rearwardly of the plane of the lenses as illustrated at 36 and instead of having a shouldered portion such as illustrated at 19 against which the rear surface of the lens is adapted to be seated the said rearwardly extending portions 36 of increased thickness are provided with a rearwardly angled surface 37 which spaces the under portion of the enlarged sections 36 from the rear surface of the lens for aiding and avoiding the collection of dirt, dust, etc., between said angled surface 37 and the adjacent rear surface of the lens and to aid in removing what dirt, dust, etc., might collect therebetween. The intersection of the surface portion 37 with the undersurface of the main rim portion or lens edge engaging surface of the main rim portion tends to function to align and retain the rims in proper relation with the lenses.

Figure 13:
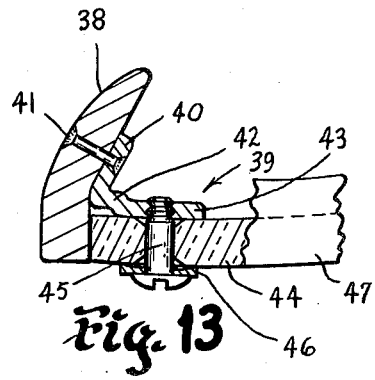
Fig. 13 is an enlarged fragmentary sectional view taken as on line 13—13 of Fig. 10 and looking in the direction indicated by the arrows.

In Fig. 10 there is illustrated a view generally similar to Fig. 1 showing a modified form of lens supporting structure which in this instance embodies integral non-metallic nose bearing pads 38 having the lens straps or lens connection means 39 secured thereto by means of plate portions 40 formed integrally with said straps 39. The plate portions 40 are secured to the nose bearing portions by means of headed rivets, pins or the like 41 which, on the nose bearing sides of the pads 38, are flush with the adjacent surface of the pads. The lens straps 39 are provided with an intermediate adjustable portion 42, see Fig. 13, which is spaced from the adjacent edge of the lens so as to permit the ear 43 to be adjusted to intimately engage the rear surface of the lens while permitting the edge of the lens to be free and not engaged by the strap.

The main distinction in the present construction over that of the construction shown best in Fig. 4 is that of providing the lens supporting structure with integral nose bearing pads 38 and attaching the lens straps 39 to the pads 38 by connecting means 41 such as pins, screws or the like whereby the ear portion 43 may be readily adjusted to properly engage the inner surface of the lens and to retain the parts in proper aligned relation with each other.

The adjustable intermediate portion 42 is particularly adapted to permit the front surface of the ear 43 to be adjusted inwardly or outwardly to compensate for different base curves of lenses.

The ear 43 is connected with the lens 44 by connection means such as the screw or the like 45 which extends through an opening in the lens and which is provided with a cupped washer 46 for engaging the outer surface of the lens. The connection means 45 may be of any of the conventional types used in the art, for example, a solder connected pin and tube member.

The rim portions 47 are provided with built-up sections 48 and 49 simulating the portions 20 and 21 of increased cross sectional dimension for introducing increased rigidity. In the present construction the main bridge portion 50 is decreased in thickness considerably so as to introduce a slight amount of resiliency when the temples are flexed in an outward direction as when removing the mounting from the face. This directs the strain imparted on the rim portions 47 to the central bridge portion 50.

It is to be understood that the mounting of Figs. 1 and 2 may be provided with a bridge such as illustrated at 50 and described herein and that the mountings 10 and 11 may be provided with a bridge such as illustrated at 13 in Figs. 1 and 2, namely, a rigid bridge instead of a resilient bridge and vice versa.

In Fig. 14 there is illustrated a further modification of rim portion 51. In this instance the rear of the main rim portion 51 is built up as illustrated at 52 so that the said built-up portion and main rim portion have a longitudinal groove 53 running lengthwise thereof. This is to permit reinforcing the main rim portion 51 while maintaining the effect of slenderness when the mounting is viewed from the front and from the side. In this figure the rearwardly extending portion 52 extends downwardly a slight amount below the plane of the inner lens edge engaging surface 54 as illustrated at 55 to provide a slight shoulder 56 against which the lens 57 is adapted to be seated.

It is to be understood, however, that a rim of the cross sectional shape of the rim shown at 14 may not necessarily be provided with a shoulder 56. For example, it may have the undersurface shape shown in Fig. 8 or the structure shown in Fig. 9 and the structure shown in Fig. 9 may be provided with a longitudinal groove such as illustrated at 53 if desired.

It is particularly pointed out that the ends 16 of the rim portions 15 are provided with inner and outer side surfaces which curve rearwardly and taper inwardly toward each other to a thickness substantially equal to the thickness of the temples 18 when viewed from the top. The said end portions 16, as best shown in Fig. 3, are angled slightly downwardly relative to the plane of the lens and have a thickness, when viewed from the side, which is greater than the front edge thickness of the rims.

The end portions 16 and the side portions of the temples 18, as shown best in Figs. 1, 3 and 5, are positioned a distance considerably above a horizontal line extending through the geometrical centers of the lenses, thereby positioning the end portions and the sides of the temples above the useful field of side vision. While the lens supporting structure, as compared with the thickness of the lenses, is relatively heavy, it is formed of non-metallic material which is exceptionally light in weight, resistant to corrosion and exceedingly comfortable and non-irritating to the flesh, and is so designed, dimensioned and related with the lenses as to provide a relatively rigid and durable support for the lenses while providing unobstructed vision throughout the sides and lower contour edges of the lenses, producing an effect simulating that obtained by rimless type mountings.

The yielding characteristics of the material from which the mounting is fabricated provides a cushion-like means surrounding the upper and nasal portions of the lenses and tends to relieve any edge contact strain on the lenses.

From the foregoing description, it will be seen that the applicant has provided simple, efficient and economical means for accomplishing all the objects and advantages of the invention, particularly that of providing a semi-rimless mounting which will be sturdy, easily assembled and which will have an attractive appearance.

Having described my invention, I claim:

1. In an ophthalmic mounting a lens supporting structure for use with a pair of lenses having a connection opening in the nasal region thereof adjacent the horizontal median line of said lenses, said structure comprising a bridge having on its opposed sides depending portions to follow the nasal edges of the lenses to below said horizontal median line of said lenses to be assembled therewith and temple supporting bar portions to follow the top edge of said lenses to the temporal side thereof, said temple supporting bar portions and depending portions having an inner lens edge engaging surface disposed substantially planal in a direction laterally thereof, with said surface extending to the outer periphery of the respective portion on at least one side thereof, and a pair of lens straps each having a plate-like end portion fixedly secured to a respective depending portion nasally of said inner lens edge bearing surface thereof and adjacent said horizontal median line of the lenses, said lens straps each having an intermediate tongue portion of adjustable nature angled forwardly therefrom in substantially parallel relation with said median line and terminating in an ear portion for securement with the surface of a lens, and with the free end of each of said temple supporting bar portions being separated from the free end of a respective depending portion by an amount less than the separation of the respective adjacent portions of the lens to be assembled therewith to cause the inner surface of said respective temple supporting bar portion and depending portion to resiliently and intimately bear on the adjacent top and nasal edge of the lens to hold it in assembled relation with the bridge while permitting the lens and bar-like portions to be laterally displaced relative to each other and about the plate-like end portion of the lens strap as an axis.

2. An ophthalmic mounting comprising a pair of lenses having a connection opening in the nasal region thereof adjacent the horizontal median line of said lenses and a central bridge having on its opposed sides depending portions to follow the nasal edge of the lenses to below said horizontal median line of said lenses and temple supporting bar portions to follow the top edge of said lenses to the temporal side thereof, said temple supporting bar portions and depending portions having an inner lens engaging surface disposed substantially planal in a direction laterally thereof, with said surface extending to the outer periphery of the respective portion on at least one side thereof, and a pair of lens straps each having a plate-like end portion fixedly secured to a respective depending portion nasally of said inner lens edge bearing surface thereof and adjacent said horizontal median line of the lenses, said lens straps each having an intermediate reduced tongue portion of adjustable nature angled forwardly therefrom in substantially parallel relation with said median line and terminating in an enlarged ear portion for securement with the surface of a lens, and with the free end of each of said temple supporting bar portions being separated from the free end of a respective depending portion by an amount less than the separation of the respective adjacent portions of the lens to be assembled therewith to cause the inner surface of said respective temple supporting bar portion and depending portion to resiliently and intimately bear on the adjacent top and nasal edge of the lens to hold it in assembled relation with the bridge while permitting the lens and bar-like portion to be laterally displaced relative to each other and about the plate-like end portion of the lens strap as an axis.

EDWARD M. SPLAINE.

REFERENCES CITED

The following references are of record in the file of this patent:

UNITED STATES PATENTS

| Number | Name | Date |
| --- | --- | --- |
| D. 112,989 | Diodati | Jan. 24, 1939 |
| 1,971,128 | Brancht et al. | Aug. 21, 1934 |
| 2,034,326 | Brown | Mar. 17, 1936 |
| 2,256,501 | Splaine | Sept. 23, 1941 |
| 2,316,817 | Splaine | Apr. 20, 1943 |
| 2,355,053 | Carlson | Aug. 8, 1944 |
| 2,357,267 | Rohrbach | Aug. 29, 1944 |
| 2,372,059 | Cook | Mar. 20, 1945 |
| 2,389,742 | Rey | Nov. 27, 1945 |
| 2,397,243 | Cooper | Mar. 26, 1946 |
| 2,436,606 | Rohrbach | Feb. 24, 1948 |
| 2,463,956 | Ellestad | Mar. 8, 1949 |

FOREIGN PATENTS

| Number | Country | Date |
| --- | --- | --- |
| 757,055 | France | Oct. 2, 1933 |
| 439,264 | Great Britain | Dec. 3, 1935 |